O. VON HUMRICK.
COMBINED COUPLING AND NIPPLE FOR ELECTRIC OUTLET BOXES.
APPLICATION FILED MAY 16, 1910.
1,035,443.
Patented Aug. 13, 1912.
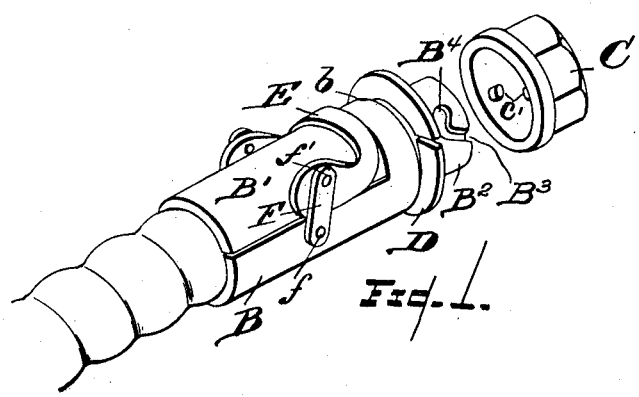
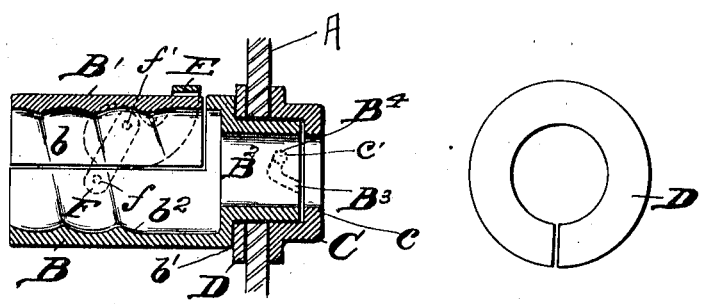
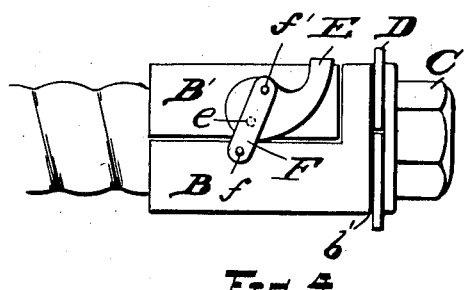
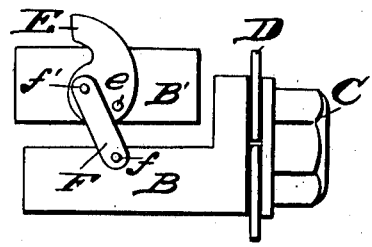
Witnesses
Grace E. Wynkoop.
John E. Lebret.
Inventor
Otto Von Humrick
By J. E. Thomas
Attorney

UNITED STATES PATENT OFFICE.

OTTO VON HUMRICK, OF DETROIT, MICHIGAN.

COMBINED COUPLING AND NIPPLE FOR ELECTRIC OUTLET-BOXES.

1,035,443.  Specification of Letters Patent.  Patented Aug. 13, 1912.

Application filed May 16, 1910. Serial No. 581,742.

*To all whom it may concern:*

Be it known that I, OTTO VON HUMRICK, citizen of the United States, residing at Detroit, county of Wayne, State of Michigan, have invented a certain new and useful Improvement in a Combined Coupling and Nipple for Electric Outlet-Boxes, and declare the following to be a full, clear, and exact description of the same, such as will enable others skilled in the art to which it pertains to make and use the same, reference being had to the accompanying drawings, which form a part of this specification.

My invention relates to an improvement in a combined coupling and nipple for electric outlet or junction boxes, shown in the accompanying drawings and more particularly pointed out in the following specification and claims.

The object of this invention is to provide a coupling which may be quickly attached to the wall of the outlet box,—the construction being such that it may be also quickly clamped around the conduit and as readily released when required; means being provided to insure against end play between the coupling and the wall of the box.

In the drawings accompanying this specification: Figure 1 is a perspective view of the combined coupling and nipple, showing the annular collar nut,—employed to lock it to the wall of the box,—disengaged from the coupling. Fig. 2 is a longitudinal sectional view showing the coupling attached to the wall of the outlet box. Fig. 3 is an elevation of a spring washer or collar sleeved upon the nipple. Fig. 4 is a side elevation of the combined coupling and nipple showing the coupling clamped upon a conduit. Fig. 5 is a side elevation showing the coupling unclamped with the pipe removed.

Referring now to the letters of reference placed upon the drawings:—A is the wall of an outlet box.

B is a coupling formed in two parts, adapted to embrace the usual type of spirally wound flexible metallic conduit,—the inner wall of the coupling having a spiral formation $b$, complementary in form to that of the conduit it is designed to embrace. One end of the coupling is formed with a projecting nipple $B^2$ preferably smaller in diameter than the body of the device in order to form a shoulder $b'$ adapted to bear against the wall of the outlet box A.

C is an annular collar or nut provided with a projecting flange $c$ overlapping the nipple end of the coupling $B^2$. The coupling B is formed with one or more L-shaped grooves or recessed portions $B^3$, formed in its outer wall to receive the inwardly projecting lugs $c'$ integral with the wall of the annular collar C. The wall of the depressions or grooves $B^3$ running substantially parallel with the end of the coupling are preferably inclined with respect thereto and are provided with a notched portion $B^4$ at one end to receive the lugs $c'$ of the annular collar C to secure it against accidental disengagement.

D is a spring washer encircling the nipple and disposed between its shoulder $b'$ and the wall of the outlet box, the purpose of the washer, as will be readily understood, being to take up any lateral play between the parts and to secure the lugs $c'$ against accidental dislodgement when interlocked with the nipple.

E is a U-shaped member pivoted at $e$ to the upper portion $B'$ of the coupling.

F is a link pivoted at $f$ to the coupling B and at $f'$ to the U-shaped member E.

It will be noted that the spiral formation given to the inner wall of the coupling terminates a relatively short distance from the end of the nipple, as indicated at $b^2$, the inner wall at this point being parallel with the outer surface of the coupling. The object of this construction is that it frequently becomes necessary to adjust the conduit to a greater or less extent with reference to the end of the coupling, owing to ragged formations of the end of the conduit, in order that it may readily enter the spiral depressions in the inner wall of the coupling. I have therefore formed a portion of the inner wall adjacent to the nipple without the spiral formation that the conduit may be adjusted back or forth to properly insure its entering the spiral way in the walls of the coupling.

Having indicated the several parts by reference letters, the operation of the device will be readily understood.

To clamp the device to the wall of an outlet or junction box, the spring washer is placed over the inner end of the nipple and the nipple inserted through the opening in the box. The annular collar or nut is now engaged to the nipple by forcing its lugs into the L-shaped grooves or recessed portions of the nipple, until they reach the end of the slots and are in position to be given a slight rotation. Forcing the lugs along the inclined way of the grooves serves to compress the spring washer thereby securing the parts against end play. Immediately upon the lugs entering the notched portion of the nipple, the annular collar or nut is locked against accidental displacement by the action of the spring washer.

The upper portion B' of the coupling B being released as shown in Fig. 4 the conduit is inserted between the parts and the upper portion B' clamped in closed engagement with the other half of the coupling by means of the U-shaped member E, by shifting the operating part E of the coupling from the position shown in Fig. 4 to that shown in Fig. 1, the pivots f' of the links F of the clamp being moved to each side of the pivot points e of the U-shaped member or operating part E during coupling and uncoupling of the device, as will be obvious from the foregoing and the drawings, particularly Figs. 1 and 4.

Having thus described my invention, what I claim is:—

In a device of the character described, a main section having a tubular extension at one end terminating in a reduced portion and a removable section of less length than the main section and forming with the latter a tubular sleeve, a bowed member pivotally secured to the removable section, links pivotally secured to the main section and pivotally secured to the bowed member, said links being so pivoted to the bowed member as to draw and clamp the main section and removable section together when the bowed member is pressed down against the removable section.

In testimony whereof, I sign this specification in the presence of two witnesses.

OTTO VON HUMRICK.

Witnesses:
GRACE E. WYNKOOP,
SAMUEL E. THOMAS.